(12) United States Patent
Fredlund et al.

(10) Patent No.: US 6,724,990 B2
(45) Date of Patent: Apr. 20, 2004

(54) DIGITAL FILM RECORDER

(75) Inventors: John R. Fredlund, Rochester, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/210,225

(22) Filed: Aug. 1, 2002

(65) Prior Publication Data

US 2004/0022533 A1 Feb. 5, 2004

(51) Int. Cl.$^7$ .............................................. G03B 33/00
(52) U.S. Cl. ...................... 396/305; 396/308; 369/125; 358/515
(58) Field of Search ................................ 396/305, 308; 355/32; 358/501, 515; 369/125

(56) References Cited

U.S. PATENT DOCUMENTS

| | | | |
|---|---|---|---|
| 3,535,992 A | * | 10/1970 | Goldmark et al. .......... 396/307 |
| 5,530,501 A | | 6/1996 | Bell |
| 5,606,379 A | | 2/1997 | Williams |
| 5,652,930 A | * | 7/1997 | Teremy et al. .............. 396/287 |
| 6,480,259 B1 | * | 11/2002 | Wong et al. .................. 355/52 |

* cited by examiner

Primary Examiner—David M. Gray
(74) Attorney, Agent, or Firm—Thomas H. Close

(57) ABSTRACT

A digital film recorder for recording a digital image on a strip of photographic film includes a light tight housing; a cartridge chamber in the housing for receiving a cartridge of unexposed photographic film; a film receiver in the housing for receiving the film strip from the cartridge, a write head located in the housing between the cartridge chamber and the film receiver, the write head including a linear array of pixels for exposing the film strip a line at a time across the width of the film strip; a film transport for moving the film from the cartridge to the film receiver a line at a time; control electronics for receiving the digital image and controlling the film transport and the write head to write the digital image on the film strip as a plurality of color separations including at least one positive human readable image.

26 Claims, 6 Drawing Sheets

DIGITAL FILM RECORDER

FIELD OF THE INVENTION

The invention relates to apparatus for recording and storing digital color image information in a human readable fashion onto photographic film for archival storage and more convenient retrieval.

BACKGROUND OF THE INVENTION

Digital photography is proving to be a very attractive means for capturing images and sharing them over the Internet. Currently, captured digital images are stored on various digital storage media, including magnetic storage media such as tape, floppy diskettes, and computer hard drives, non-volatile semiconductor memory chips, and optical storage media such as writable CD's and DVD's. There are two fundamental problems associated with all such digital storage media; they are not archival, and the information contained on them is not human readable without the use of a reader that can translate the digital information to a visible image. As used herein, the term archival storage means storage that will reliably retain the stored information for at least 50 years.

It is widely known that the magnetic coatings on magnetic digital storage media deteriorate in a relatively short time and the information on the media can be lost as the magnetic coatings deteriorate. The storage life of magnetic media is usually judged at less than 10 years. Optical storage media may last longer (e.g. in the neighborhood of 20 years), but is still not considered to be archival. In addition, the storage formats and equipment for reading the digital data are constantly evolving so that so that in a very short amount of time, the equipment needed to recover previously stored digital information becomes obsolete. The information then needs to be transferred to a new storage medium, or it will become very inconvenient to read. Without a convenient way of reading the old digital storage media, and in the absence of a human readable record of what the storage media contains, the digital data becomes easily lost or misplaced, and not easily identified if the storage media is discovered some time in the future.

One of the greatest features of conventional silver halide photography is that it serves well to preserve images for posterity. Since a silver halide image (negative or more so positive) is human readable, the image content can be readily identified without the use of equipment, thereby limiting the chance that a valued image will be inadvertently destroyed, discarded or lost at some time in the more distant future. Silver halide film images are also easy to store and they take up relatively little space due to their flat format. Although storing silver 10 halide images in the "shoe box" has been derided as the final resting place of photographs, it has proven to be a remarkably economic, convenient and efficient way to keep family images for future generations.

Recognizing the archival storage and human readable advantages of photographic film for storing images, U.S. Pat. No. 5,606,379 issued Feb. 25, 1997 to Williams, proposes a method of recording color images on a monochromatic photographic recording medium by the steps of separating the color image into three color components, one luminance component and two chrominance components, and recording the three color components on adjacent areas of the recording medium, the luminance component being recorded on a larger area than either of the two chrominance components.

Digital cameras that produce instant prints are known, for example, the Olympus Camedia C-211 includes a Polaroid print engine that produces a Polaroid instant print. Due to their expense and volume, these prints are not convenient for archival storage of large numbers of images.

Electronic film writers have long been known in the art, however, all of the known film writers are currently employed in film processing laboratories or graphic arts shops, and are therefore quite complicated and expensive. One of the least expensive film writers available today is the ProPalette 7000 Digital Film Recorder manufactured by the Polaroid Corporation, and selling for about $5,000. At this price, using film for storing digital images is not practical for the amateur photographer.

There exists a need therefore for a low cost digital film recorder that can be used by an amateur photographer for storing digital images captured by a digital camera.

SUMMARY OF THE INVENTION

The need is met according to the present invention by providing a digital film recorder for recording a digital image on a strip of photographic film, that includes a light tight housing; a cartridge chamber in the housing for receiving a cartridge of unexposed photographic film; a film receiver in the housing for receiving the film strip from the cartridge; a write head located in the housing between the cartridge chamber and the film receiver, the write head including a linear array of pixels for exposing the film strip a line at a time across the width of the film strip; a film transport for moving the film from the cartridge to the film receiver a line at a time; control electronics for receiving the digital image and controlling the film transport and the write head to write the digital image on the film strip as a plurality of color separations including at least one positive human readable image.

ADVANTAGES

The film recorder according to the present invention has the advantage that it can be produced and sold for a very low cost such that an amateur photographer can store her images on conventional photographic film, thereby providing an archival, human readable storage of personal photographic images captured by a digital camera. The film recorder has the further advantage that the storage medium, photographic film, and the means for developing the film are conveniently and inexpensively available everywhere in the world.

DETAILED DESCRIPTION OF THE INVENTION

Figure 1:
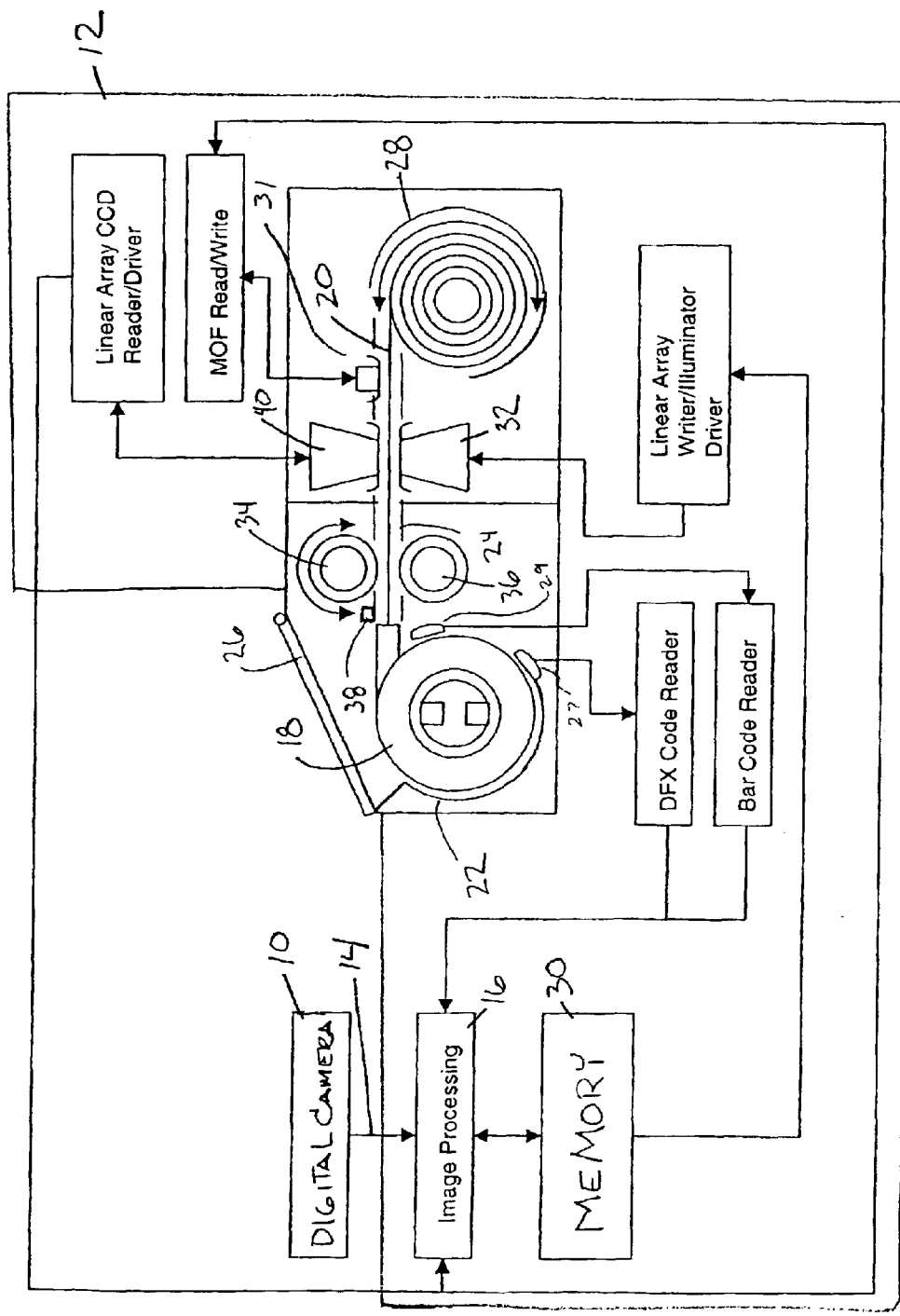
FIG. 1 is a diagram of a system including a film writer according to the present invention.

Referring to FIG. 1, a color digital camera 10 is connected to film writer 12 via a USB or other data interface 14 for transmitting data from one device to another. After a color image file is downloaded from the camera 10 to the writer 12, a processor 16 in the writer formats the color image file as necessary for writing a human readable image. A cartridge 18 of photographic film 20 is placed in the writer 12. This film is preferably 35 mm monochrome film, but may comprise other types of film such as color reversal or color negative film It should be noted that while 35 mm film is preferred due to its low cost and availability, other formats such as APS can be used if the writer/reader is designed accordingly. Once the writer/reader is loaded with both an image file and a receiving film, the image file is written to the film 20 as described below. Upon completing exposure, the film is rewound into its cassette, unloaded from the film writer, and sent or taken to a photofinisher for processing. It will be understood that the film writer may write many images in succession and might not be removed until the entire roll of film is exposed.

If the film that has been exposed in the writer is a traditional type such as 35 mm monochrome film, color reversal, or color negative film, it will be developed in the traditional manner, for example C-41 for color negative film, thereby providing a human readable archival record of the images. The film is returned to the owner after processing. Prints may be made by the photofinisher at this time, but need not be.

In a preferred embodiment of the present invention, the film writer 12 also functions as a film reader for reading the developed images written on the film. The processed film may now be inserted into the writer/reader. A sensor within the film writer 12 reads the image on-the film to recreate the digital image file. The writer 12 can transmit the recreated digital image file to a digital camera for viewing on the camera display, or to a digital color printer for making prints of the image. The writer may also be connected to a computer via the data transmission link and may transfer the recreated file to the computer via that link.

The film writer 12 will now be described in detail. A film roll holding chamber 22 accepts the film cartridge 18. The film writer includes a self loading feature as found in conventional photographic cameras. The user aligns the tongue of the unexposed film 20 along the film positioning rails 24 and closes a door 26. In response to closing the door 26, the film is prewound into a take-up chamber 28. The door 26 is locked while the film is in the prewound condition. The film is now in position for writing. The image file is delivered from the digital still camera via the data interface 14. The image processor 16 in the writer 12 receives the image file and stores it in a memory 30. Alternatively, the camera 10 may reconfigure the image for writing. In this manner the memory 30 in the writer can be minimized. The writer 12 includes sensors 27 and 29 for sensing a DFX code on the film cartridge 18, or a bar code on the film cartridge 18, respectively. The writer 12 may also include a magnetic read/write head 31 for reading and/or writing magnetically encoded information on a magnetic layer on the film.

The processed image data is sent to a write head 32 for writing on the film. The write head 32 is preferably a linear array of LEDs or OLEDs positioned substantially perpendicular to the long dimension of the filmstrip. The LEDs emit a wavelength of light to which the film is sensitized. The processor 16 comands the write head 32 to write a single column of dots. The processor 16 causes a stepper motor 34 to drive a capstan 36 that moves the film a predetermined distance in the long dimension of the film and then stops. This writing operation is repeated until the entire image file is recorded. Alternatively, the motor may move the film continuously and the writing operation carried out a line at a time as the film moves past the write head.

Figure 2:
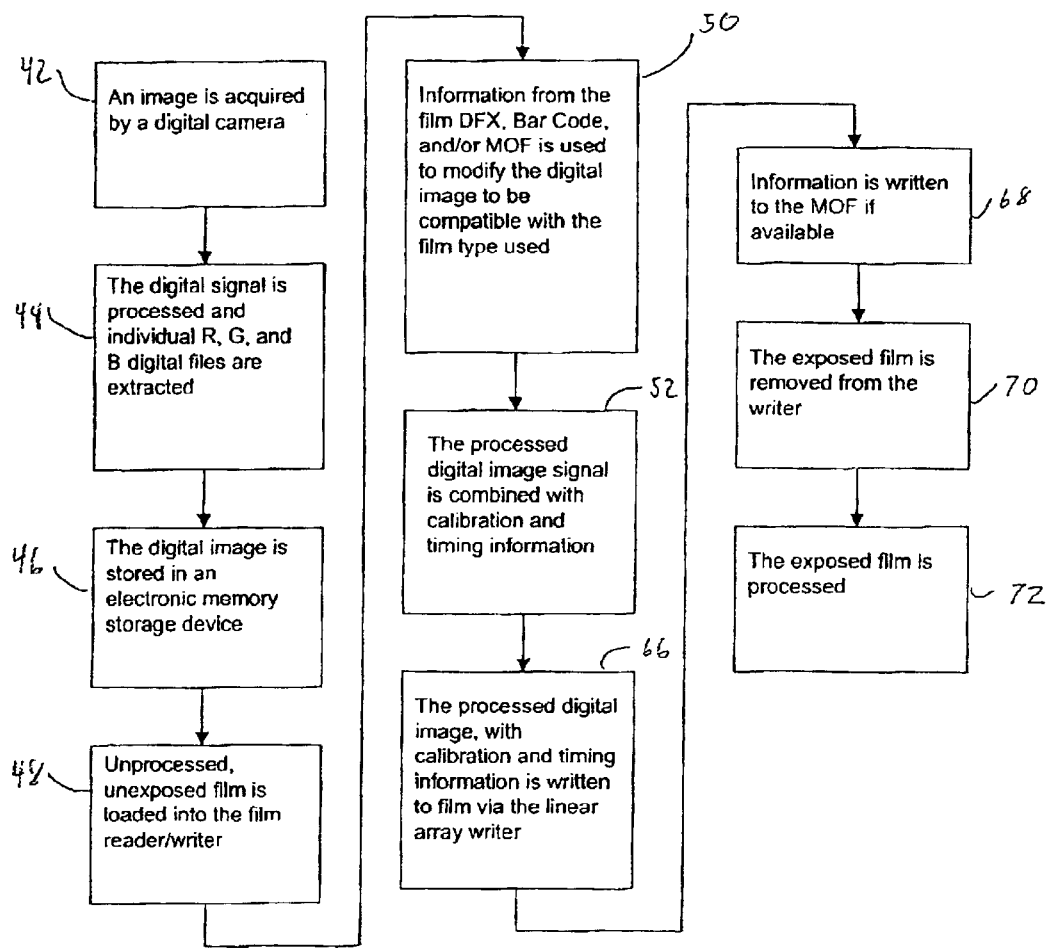
FIG. 2 is a flowchart showing an example of a process used in writing a digital image to film with the film writer of the present invention.
Figure 4:
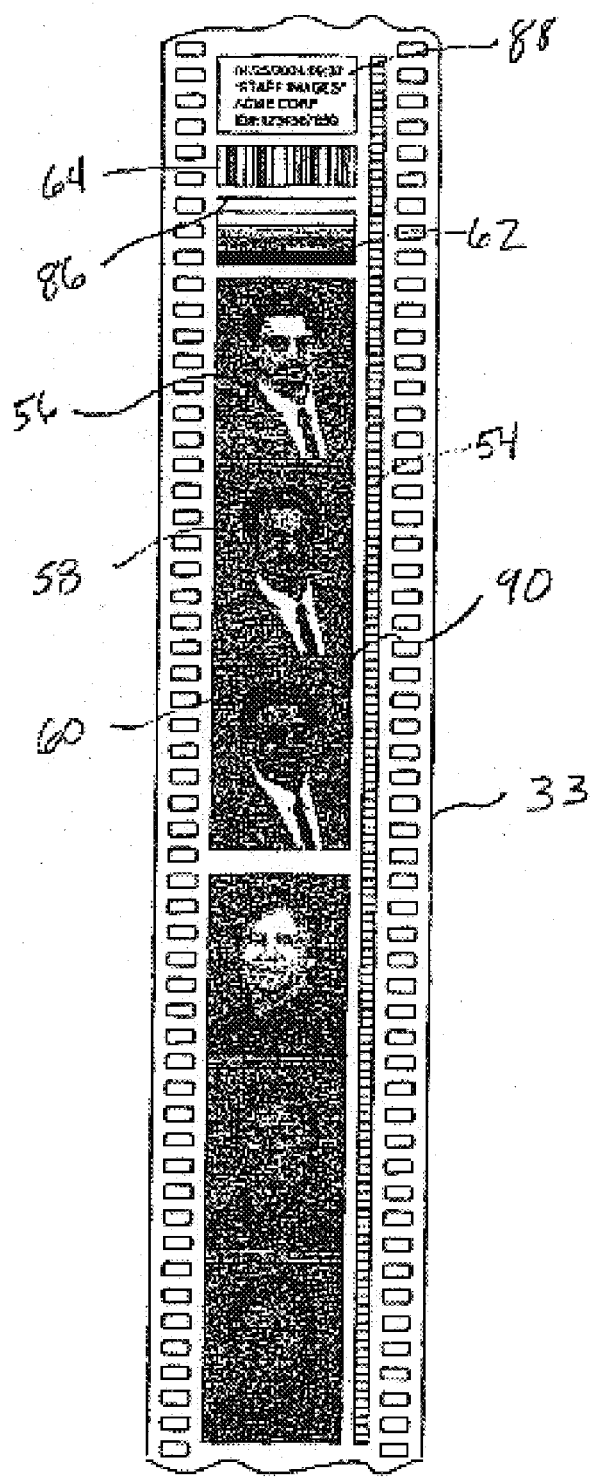
FIG. 4 shows a film written by the film writer invention.

Referring to FIG. 2, an image is acquired 42 by a digital camera. The digital image signal from the camera is processed and individual color separations, such as red, green and blue color files arc extracted 44. The digital image is stored 46 in the memory 30. Unprocessed film 20 is loaded into the writer 12 as described above 48. Information from film DFX, or barcode and/or magnetic information on the film is employed 50 to modify the digital image to be compatible with the film type used in the writer. The processed digital image signal is combined 52 with calibration and timing information. As shown on processed filmstrip 33, shown in FIG. 4, the timing information appears in the form of a timing track 54 adjacent the color separation images 56, 58 and 60 on the film. The calibration information 62 is in the form of an exposure series created by known code values applied to the write head 32. Additional data such as the code values used to create the calibration information, the resolution of the images, and the coordinates of the color space represented by the color separations are provided in a bar code region 64. Similarly, human readable text 88 may be written to further increase the usefulness of the filmstrip 33. The processed digital image with calibration, timing information, bar code data, and human readable text is then written 66 to the film. If the film contains a magnetic coating, magnetic information can be written to the film 68.

The writing operation may be repeated for additional image files until the film is filled with images. The film is then wound back into the cartridge 18, and the door 26 is unlocked. The door 26 is opened by the user and the film cartridge 26 is removed 70 and sent for processing 72.

Figure 3:
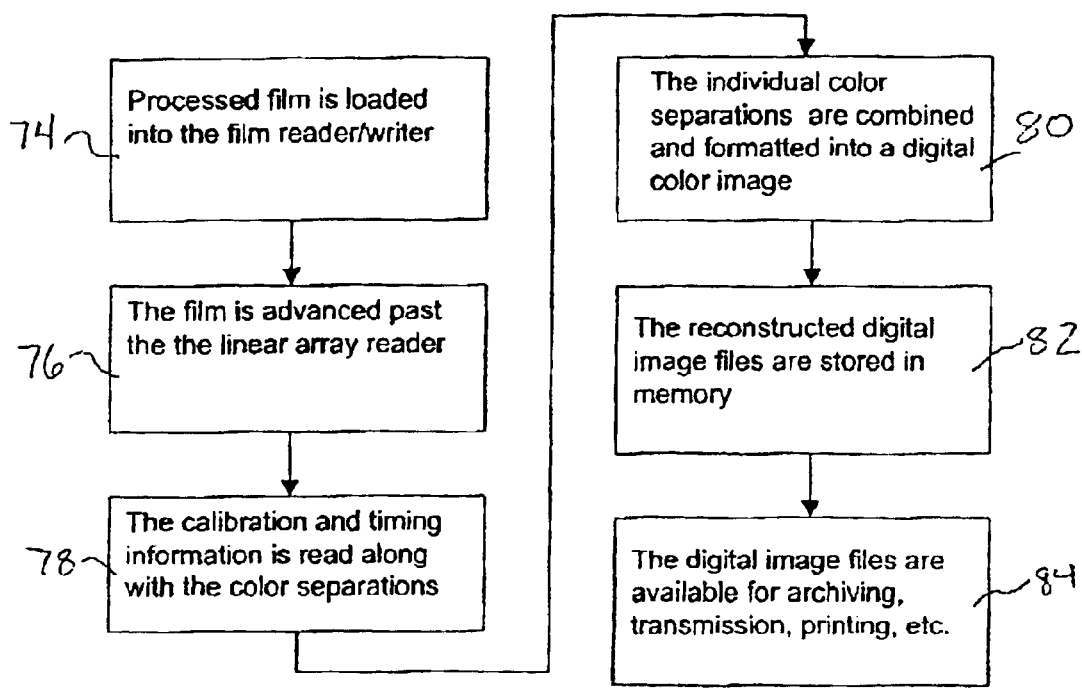
FIG. 3 is a flowchart showing an example of a process used in reading images from film written by the film writer.

Referring to FIG. 3, the reading operation is similar. The user opens door 26 and inserts 74 the processed filmstrip into rails 24 to engage the capstan drive. An alternative method (not shown) of loading processed film may be provided to accommodate cut strips of film. The processor 16 senses the presence of film in the film drive by means of a sensor 38 and begins the reading operation. The film is advanced 76 past the read head 40 which is preferably a CMOS linear array of photocells positioned substantially perpendicular to the long dimension of the filmstrip, using the timing track 54 to synchronize the read out operation. The write head 32 may provide illumination for the read head All of the pixels of the write head 32 are driven at a constant light output and the read head scans the film a line at a time. Alternatively, the read head 40 may be a single detector, and the write head 32 may be illuminated one pixel at a time to scan the film. Calibration and timing information is read 78 along with the color separations. The individual color separations are combined and formatted 80 into a digital color image. The reconstructed digital image files are stored 82 in memory 30. The digital image files are now available for transmission, printing or display 84.

There may be many fields of sampled analog signals or digital data or both, written to the film. It is to be understood that although any manner of signal may be written, it is essential to the utility of the system that at least one positive human readable image representing the image file is written to the film. This image is a monochrome image in the preferred embodiment This image file is human readable and allows the image file contained on the film to be identified by merely illuminating the filmstrip from the rear. This is a substantial advantage over fully digital image archiving systems that make it impossible for the user to identify the image as written by visual inspection. The positive image recorded will not be the image traditionally recorded by an optical camera exposing chemical film. In the case of 35 mm monochrome negative film, a camera will capture light that exposes the film and create a negative image of the scene. The film writer 12 creates at least one positive image, thus facilitating human identification of the imagery. 35 mm color negative film will be written in a similar manner. At least one positive monochrome image will be written to the color negative film. Although this film has a characteristic orange mask, the resulting image is still identifiable. Color reversal film will be exposed similarly to the way it is traditionally recorded by an optical camera exposing chemical color reversal film.

In a preferred embodiment, the write head 32 is a monochrome device in order to minimize cost. Since the writer can only expose in one color, it is necessary to expose a record for each color. This may be as simple as exposing a field for each of the red, green and blue color planes or by exposing cyan, magenta, yellow, and black planes. Identifiers may be written to call out the type of plane that is written. Other approaches such as writing luminance and chrominance channels may be used. Additionally, a single positive index image may be written along with a large amount of digital data In this case, the retrieval of data will ignore the positive index image. However, this approach is not preferred since the digital data may not use the available area on the film as efficiently as the sampled analog image.

If the write head is not monochrome, the three channels may be superimposed when using color negative or color reversal film. Similarly, a white-light emitting source may be filtered to achieve the same result. These approaches are not favored due to the additional expense they will add to the writer/reader.

The writer may use an emitter array that is not extremely linear in response from pixel to pixel. A preferred technique for allowing the use of such low-linearity emitters is to write a calibration patch 62 to the film. While this calibration patch is similar to the stepped gray scale filler strip described by Williams in U.S. Pat. No. 5,606,379, the intention is to provide a reference by which the non-linearities of the emitter can be removed from the digital representation of the file that is delivered by the reader The calibration patch is preferably written in conjunction with each image, since images may be separated by the cutting operation commonly performed during processing. This patch may be composed of known values that can be read when the processed film is placed in the writer/reader. Comparing the known values to the measured values will yield a table that can be used to correct non-linearity in the emitter output This can also correct non-linearity in the illumination system used for reading the filmstrip.

The writer 12 may also accommodate defective pixels within the linear array of emitters. If pixels are provided in addition to the pixels used for writing the image, and additional filmstrip width is provided to receive the exposure from these additional pixels, then a row for each defective pixel can be placed at the outer edges of the image. This will compromise the human readability of the image written to a small extent, but unless the defective pixels become excessive, the image will remain readable. A marking is placed on the film to indicate that defective pixels have been detected and the marking also indicates where the correct data has been placed on the film.

The defective pixels may be detected at the time of manufacture. If this is the case, then the location of the defective pixels is loaded into the memory of the writer 12, and additional pixels are energized accordingly. If the writer 12 is capable of detecting defective pixels prior to a writing operation on the basis of reading the output from the emitter array, then the writer 12 can perform a test to determine if there are defective pixels at any time when film is not extended into the read/write area of the writer 12.

If defective pixels are determined within the sensor array, an alternative to energizing additional pixels is to use the image data from pixels adjacent to the defective pixel to interpolate the data and create a replacement pixel. Allowing the emitter and sensor array to contain defective pixels allows the cost of the arrays to be low.

The read head may be comprised of a plurality of columns of sensor pixels. If there is more than one column, skew between the pixels as written to the film and the read head can be compensated for. In particular, if the pitch of the read head pixels is smaller than that of the pixels written to the film, the determination of the film pixel values can be facilitated on the basis of testing done with the calibration patch. Note that a portion of the calibration patch can help determine the skew. The skew can be noted on the basis of signal strength from adjacent pixels. A single column of pixels 86 (see FIG. 4) can be read by the sensor to determine the film to read head skew. An alternative correction is to add a small motor and positioning member to adjust the angle of the read head or the write head used for illumination on the basis of the detected skew. In this case, a single column of sensor pixels would suffice. Nonetheless, redundancy may be desired to increase reliability.

In a preferred embodiment the writer 12 writes a timing track 54 to the film as well as the color separations. This timing track 54 allows the column-to-column distance accuracy of the write operation to be relaxed. If the writer can determine the position of the columns of pixels, then they need not be exactly regularly spaced. The jitter in the write operation can be removed during the read operation. Although this jitter will adversely affect the human readability, the errors will be small, and if noticeable, will not make the image unidentifiable. Since the jitter and non-linearity are relatively small, the human readability of the positive image will remain acceptable for visual identification.

In addition to writing captured image data, the writer 12 can write layers in addition to channels. For example, a program such as Adobe Photoshop 6.0 is capable of creating layers for composing composite images. The writer can write these layers separately to the film for storage so that they may be retrieved as layers.

In order to support multiple formats of writing, it will be necessary for the writer to write an ID or description on film describing the writing format. This ID will allow the user to pick the format he prefers or the one his writer model is capable of writing. For example, if the resolution of the writer is inadequate to record the full resolution of the image in a single frame, the ID may describe a format where 2 frames are used to record the image, and the image file will be written accordingly. The ID may be contained in bar code 64.

Figure 5A:
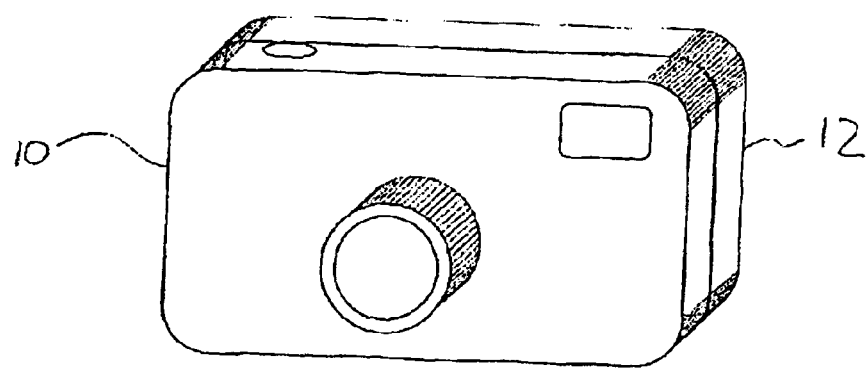
FIG. 5 is a front perspective view showing a camera having a detachable film writer according to the present invention.
Figure 5B:
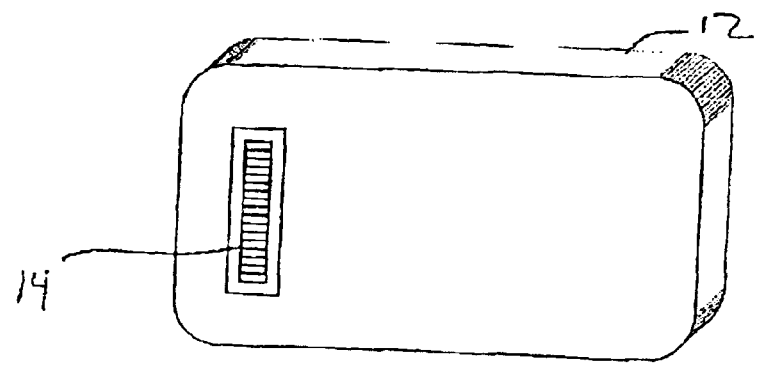
Figure 5B:
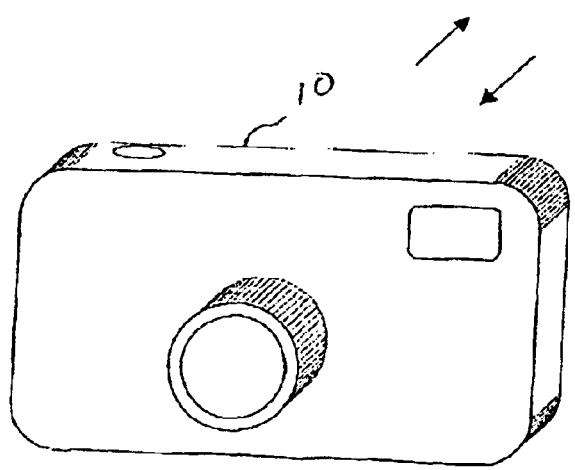
Figure 6A:
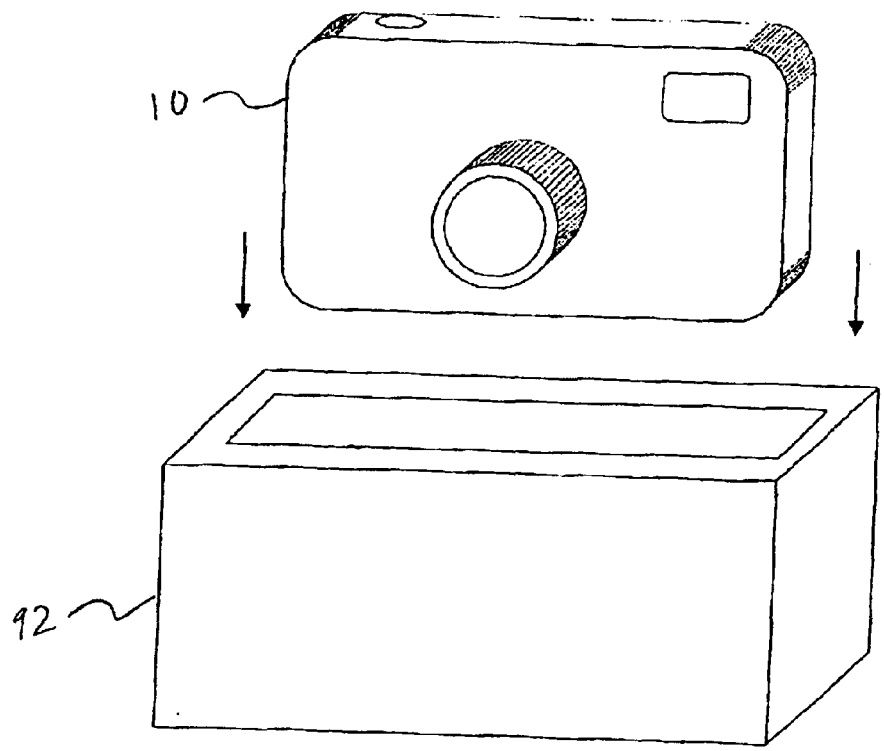
FIG. 6 is a front perspective view showing a camera having a detachable film writer according to the present invention.
Figure 6B:
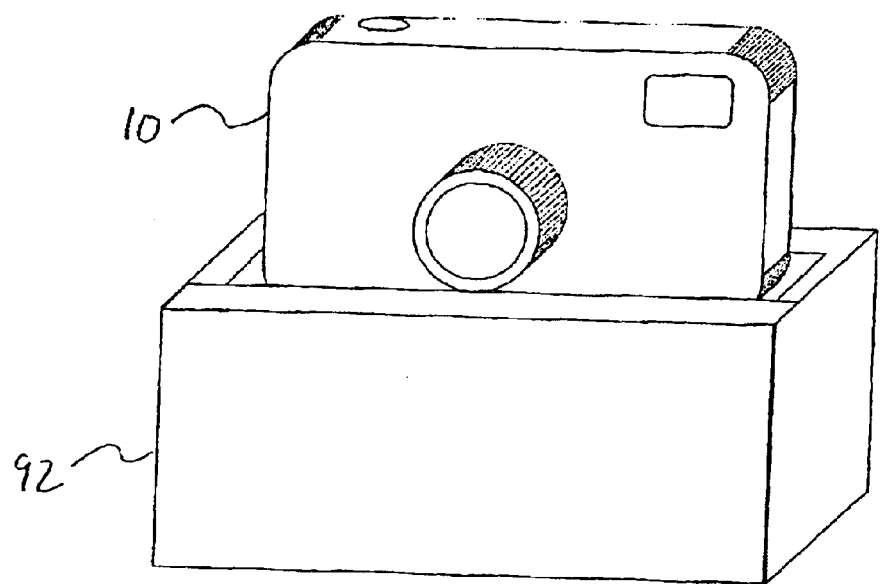

Referring to FIGS. 5A and B, the writer 12 can be designed as an attachment to a digital camera 10 that allows image storage at locations unassociated with a computer. The writer is connected to the digital camera and image data is communicated to the writer by a connector 15 that is the physical portion of a data interface 14 such as a USB interface. There it is written to the film, providing a permanent record (after processing). The digital camera user is free to delete files and continue capturing images.

Another use for the writer is to incorporate it directly into a digital camera. This incorporation provides a means of minimizing the memory used in the camera. The user can use the digital camera to capture and review images to determine if they are worth keeping. If not, the images are deleted. If the images are deemed to have value, only after review will the camera with writer write the image to the film. Note that the reader function may not be implemented in the camera to save cost and complexity. Images need not be completely deleted from electronic memory if display is desired. However, only lower resolution images need be stored for display on the camera or for a low resolution display such as a television after the high-resolution image has been recorded on film.

An alternative to placing the writer in the camera is to include it in a dock 92. The camera can deliver data to the writer when the camera is placed in the dock 92. Since the dock can be tethered to a power source, the power needs of the writer will not be an issue.

The writer may also be attached to a computer. Any source of digital image files may be used to provide image data to the writer, and any device capable of receiving digital data may be used to store digital image files read from the film by the writer.

Because of the design of the writer, using a data track, linear write head, and color separations, it can be manufactured at extremely low cost. It may be provided for use as a single use device. In particular, if an electronic camera owner wishes to take many pictures on a vacation, he may not wish to keep all of his captured images in electronic form. A common problem with electronic cameras is that once the expensive available memory is filled with images, the system is rendered useless. A single use writer (writer only in this case) of the type described in this invention would provide a low cost repository for images. When the user has filled his electronic memory, he can connect the camera to the writer and save the digital images to film. Once saved, the user can delete the images from electronic memory and continue to capture images. Upon returning from vacation, the single use writer module can be delivered to a photofinisher for processing and any other services desired.

In addition to saving images on the film, the user may order services desired by placing order information on the film. Either the camera or the writer running appropriate software can cause the film to be marked in a fashion that the photofinisher can interpret as an order for services. This marking can be as simple as a bar code. Additionally, markings that are associated with image content, time of capture, location, etc. may be included to help with later organizing.

The film exposed in the writer/reader may not need to be processed by a photofinisher. If the film is 35 mm monochrome, it may be processed in a home processor such as the Polychrome processor manufactured by the Polaroid Corporation. This system uses laminants with photoprocessing chemicals to process the film. Similarly, if the film is of a special type such as a thermally developed film, this film may also be processed without a trip to the photofinisher.

It may be desirable to expose images with the writer such that traditional photofinishing practices do not separate the planes or other data associated with a particular image. It may be necessary to write a border between color or data planes so that the notching device that determines where the strips of film will be cut will be fooled into not cutting apart the planes or other data associated with a particular image. This objective may be achieved by writing a gray patch 90 between the planes and data, or by butting the planes and data up against one another. In U.S. Pat. No. 5,530,501 issued Jun. 25, 1996, Bell teaches an interruption of the laydown of data on a film strip to accommodate the cutting of film into strips. In the present invention, areas are written to the film to ensure that all of the imagery and data associated with a particular image are contained on the same strip as cut by the photofinisher.

The embodiment of the writer/reader that has been described uses linear arrays to minimize cost. However, if the difference in cost between the linear arrays and motors necessary to use them approaches that of an area array of adequate resolution, then the use of an area array my become preferred. Skew and pitch variations will be eliminated. However, flexibility of formats written to the film may be reduced.

The invention has been described in detail with particular reference to certain preferred embodiments thereof, but it will be understood that variations and modifications can be effected within the spirit and scope of the invention.

| PARTS LIST | |
|---|---|
| 10 | digital camera |
| 12 | film writer |
| 14 | data interface |
| 16 | processor |
| 18 | cartridge |
| 20 | photographic film |
| 22 | holding chamber |
| 24 | film positioning rails |
| 26 | door |
| 27 | sensor |
| 28 | take-up chamber |
| 29 | sensor |
| 30 | memory |
| 31 | MOF read/write head |
| 32 | write head |
| 33 | developed filmstrip |
| 34 | stepper motor |
| 36 | capstan |
| 38 | sensor |
| 40 | read head |
| 42 | acquired image |
| 44 | extracted color files |
| 46 | stored digital image |
| 48 | film loaded |
| 50 | film information |
| 52 | signal combined |
| 54 | timing track |
| 56 | color separation image |
| 58 | color separation image |
| 60 | color separation image |
| 62 | calibration information |
| 64 | bar code region |
| 66 | bar code data |
| 68 | magnetic information written |
| 70 | cartridge removed |
| 72 | processing |
| 74 | insert processed filmstrip |
| 76 | film advanced |
| 78 | calibration and timing information read |
| 80 | color separations formatted |
| 82 | reconstructed files stored |
| 86 | column of pixels |
| 88 | human-readable text |
| 90 | gray patch |
| 92 | dock |

It is claimed:

1. A digital film recorder for recording a digital image on a strip of photographic film, comprising:
   a) a light tight housing;
   b) a cartridge chamber in the housing for receiving a cartridge of unexposed photographic film;
   c) a film receiver in the housing for receiving the film strip from the cartridge;
   d) a write head located in the housing between the cartridge chamber and the film receiver, the write head including a linear array of pixels for exposing the film strip a line at a time across the width of the film strip;
   e) a film transport for moving the film from the cartridge to the film receiver a line at a time; and
   f) control electronics for receiving the digital image and controlling the film transport and the write head to write the digital image on the film strip as a plurality of color separations including at least one positive human readable image and a timing track for assisting in the readout of the recorded image.

2. The film recorder claimed in claim 1, further comprising a portable power supply.

3. The film recorder claimed in claim 1, wherein the linear array of pixels is an array of light emitting diodes.

4. The film recorder claimed in claim 1, wherein the light emitting diodes are OLEDs.

5. The film recorder claimed in claim 1, wherein the linear array is a light valve with a back light source.

6. The film recorder claimed in claim 1, wherein the linear array emits a narrow bandwidth of light.

7. The film recorder claimed in claim 1, wherein the color separations are a luminance image and one or more lower chrominance images.

8. The film recorder claimed in claim 7, wherein the luminance image has a higher spatial resolution than the chrominance images.

9. The film recorder claimed in claim 7, wherein the luminance image has a larger bit depth resolution than the chrominance images.

10. The film recorder claimed in claim 1 wherein the color separations are cyan, magenta, yellow, and black.

11. The film recorder claimed in claim 1 wherein the color separations are positive images.

12. The film recorder claimed in claim 1, wherein the film transport includes a stepper motor.

13. The film recorder claimed in claim 1, wherein the control electronics causes the write head to write calibration information in the form of an exposure series for assisting in the readout of the recorded image.

14. The film recorder claimed in claim 13, wherein the control electronics drives the write head to write a bar code containing code values used to create the calibration information.

15. The film recorder claimed in claim 1, wherein the linear array has a lower resolution than the digital image, and the control electronics further includes means for generating a lower resolution image and a delta image representing the difference between the lower resolution image and the digital image, and means for writing both the lower resolution image and the delta image.

16. The film recorder claimed in claim 1, further including a read head located in the housing between the cartridge chamber and the film receiver, the read head including a linear array of pixels for sensing light transmitted through the film strip a line at a time across the width of the film strip, whereby the film recorder can also function as a film scanner.

17. The film recorder claimed in claim 16, wherein the read head is located opposite the write head, and the write head functions as a light source for the read head.

18. The film recorder claimed in claim 17, wherein the control electronics includes means for calibrating the write head output using the read head.

19. The film recorder claimed in claim 18, wherein the calibration includes detecting defective pixels in the write head, and wherein the write head includes additional pixels and the control electronics drives the additional pixels to write information intended for the defective pixels at an outer edge of the image.

20. The film recorder claimed in claim 17, wherein the control electronics drives the write head to write calibration information in the form of an exposure series on the film for assisting in reading out the image on the film.

21. The film recorder claimed in claim 17, wherein the control electronics drives the write head to write alpha numeric and machine readable data on the film.

22. The film recorder claimed in claim 17, wherein the control electronics drives the write head to write a single line across the film that can be used to sense skew of the write head with respect to the film in a film scanner.

23. The film recorder claimed in claim 1, further comprising a magnetic write head for writing information on a magnetic layer on a photographic film.

24. The film recorder claimed in claim 1, wherein the control electronics drives the write head to write a bar code containing resolutions of the color separations, or coordinates of a color space represented by the color separations.

25. The film recorder claimed in claim 1, wherein the control electronics drives the write head to write human readable text.

26. The film recorder claimed in claim 1, wherein the write head contains defective pixels and additional pixels and the control electronics drives the additional pixels in the write head to write information intended for the defective pixels at an outer edge of the image.

* * * * *